United States Patent [19]

Ishizuka et al.

[11] Patent Number: 5,585,843
[45] Date of Patent: Dec. 17, 1996

[54] VIDEO CAMERA WITH IMAGE SHIFT CORRECTION

[75] Inventors: Shigeki Ishizuka; Takayuki Sasaki, both of Kanagawa; Takao Takahashi, Tokyo, all of Japan

[73] Assignee: Sony Corporation, Japan

[21] Appl. No.: 469,497

[22] Filed: Jun. 6, 1995

Related U.S. Application Data

[63] Continuation of Ser. No. 893,201, Jun. 2, 1992, abandoned, which is a continuation of Ser. No. 673,783, Mar. 22, 1991, abandoned.

[30] Foreign Application Priority Data

Mar. 31, 1990 [JP] Japan .................................. 2-085693

[51] Int. Cl.$^6$ .................................................. H04N 5/228
[52] U.S. Cl. ........................................ 348/208; 348/700
[58] Field of Search .................................... 348/207, 208, 348/155, 699, 700, 701, 702; H04N 5/228

[56] References Cited

U.S. PATENT DOCUMENTS

| | | | |
|---|---|---|---|
| 4,472,741 | 9/1984 | Takatsu et al. | 358/213 |
| 4,630,114 | 12/1986 | Bergmann et al. | 358/136 |
| 4,731,651 | 3/1988 | Matsumoto et al. | 358/140 |
| 4,924,305 | 5/1990 | Nakagawa et al. | 358/105 |
| 4,959,725 | 9/1990 | Mandle | 358/222 |
| 5,019,901 | 5/1991 | Uomori et al. | 358/105 |
| 5,053,876 | 10/1991 | Blissett et al. | 358/222 |
| 5,099,323 | 3/1992 | Morimura et al. | 358/105 |
| 5,253,052 | 10/1993 | Hanashiko et al. | 358/105 |

FOREIGN PATENT DOCUMENTS

| | | | |
|---|---|---|---|
| 0348207 | 12/1989 | European Pat. Off. | H04N 5/14 |
| 0392671 | 10/1990 | European Pat. Off. | H04N 7/137 |
| 62-025590 | 2/1987 | Japan | H04N 7/01 |
| 1125064 | 5/1989 | Japan | H04N 5/217 |
| 2031570 | 2/1990 | Japan | H04N 5/232 |
| 2280471 | 11/1990 | Japan | H04N 5/232 |
| 2080993 | 2/1982 | United Kingdom | G08B 13/18 |

OTHER PUBLICATIONS

Applicant's Submitted Prior Art (FIG. 1).

*Primary Examiner*—John K. Peng
*Assistant Examiner*—Tuan V. Ho
*Attorney, Agent, or Firm*—Limbach & Limbach L. L. P.

[57] ABSTRACT

A video camera has image shift amount detection means which detects an amount of an image shift by the used of a field correlation of the image information outputted from image pick-up means. The image information is corrected by means of the output of the image shift amount detection means in image shift correction means, and then converted into video signals representing consecutive add and even fields in a cycle of a field in video signal conversion means so that the image shift can be corrected with degradation in picture quality effectively avoided.

2 Claims, 8 Drawing Sheets

VIDEO CAMERA WITH IMAGE SHIFT CORRECTION

This is a continuation of application Ser. No. 07/893,201 filed on Jun. 2, 1992, now abandoned, which is a continuation of Ser. No. 07/673,783, filed Mar. 22, 1991, now abandoned.

BACKGROUND OF THE INVENTION

This invention relates to a video camera, and more particularly may be applied to camera incorporated video tape recorder.

In the conventional television camera, there has been proposed an image shift correction technique in which image shift is corrected by shifting an image by an amount of the image shift made.

Figure 1:
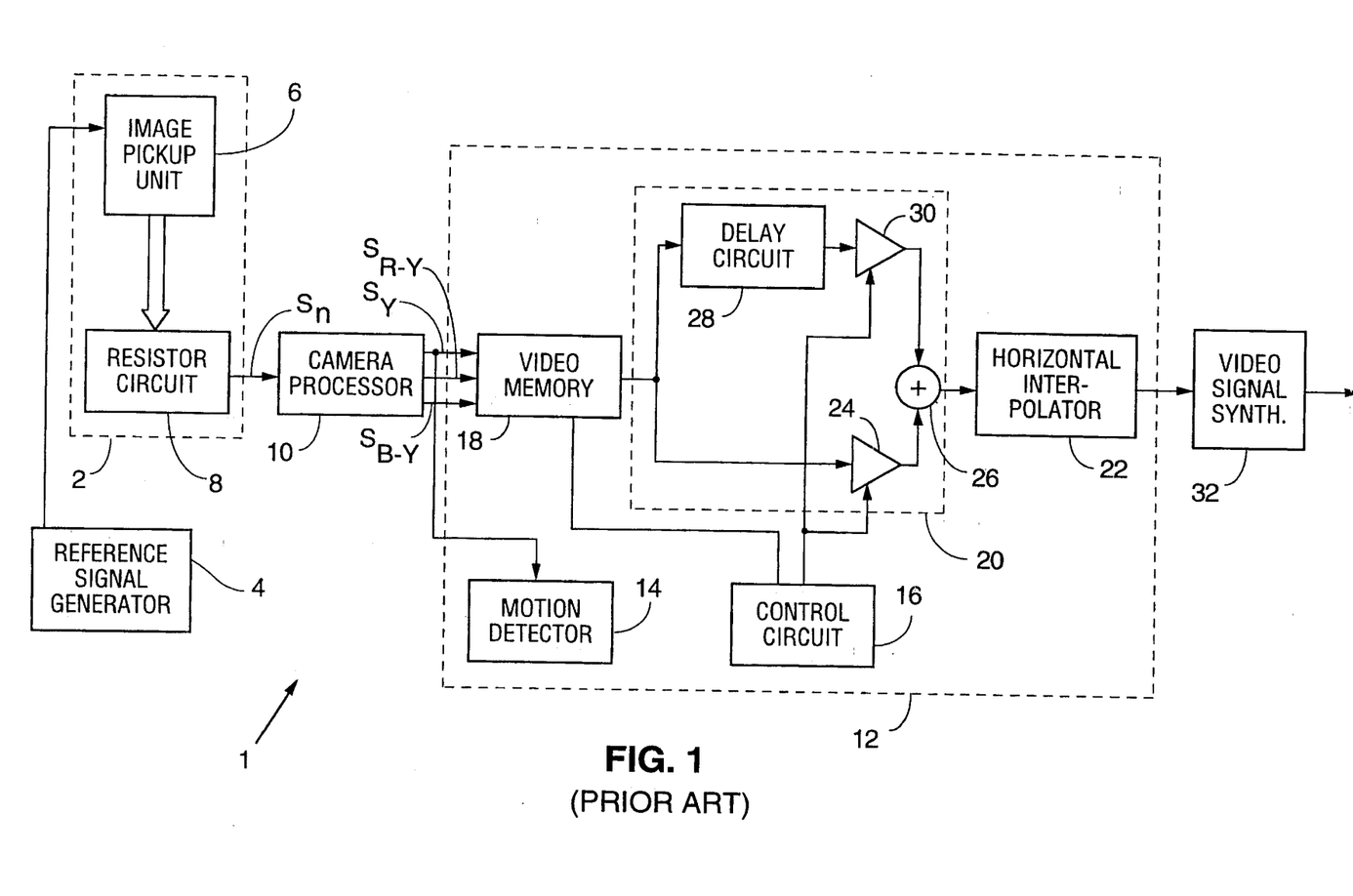
FIG. 1 is a block diagram showing the conventional television camera.

More specifically, a television camera 1, as shown in FIG. 1, picks up an image of an object by means of CCD (charge coupled device) solid state pick-up device 2, for example.

The solid state pick-up device 2 includes an image pick-up unit 6 which has light receiving elements arranged in a unit of a pixel for horizontal and vertical scanning, and according to a reference signal from a reference signal generating circuit 4 the pick-up unit 6 sequentially outputs charges accumulated in each light receiving element to a camera process circuit 10 through a resistor circuit 8.

Figure 2:
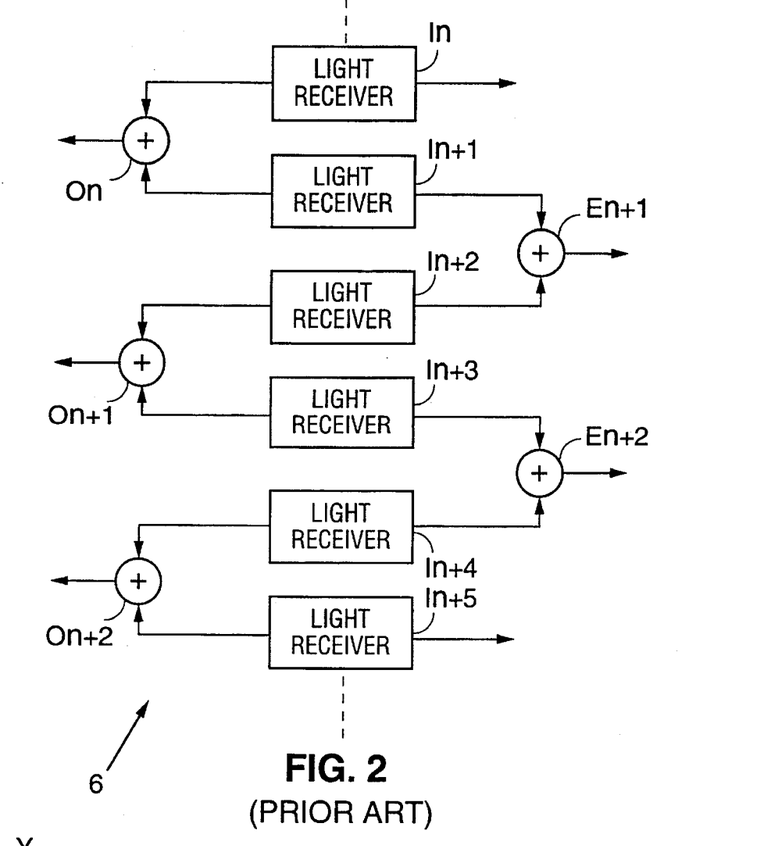
FIG. 2 is a diagrammatic view for illustrating the pick-up device.

As shown in FIG. 2, in the pick-up unit 6, electric charges are sequentially outputted from light receiving elements $I_n$, $I_{n+1}$, ... through adder circuits $E_{n+1}$, $E_{n+2}$, ... for even fields and through adder circuits $O_n$, $O_{n+1}$ ... for odd fields, and picked-up image signals $S_n$ which are generated by consecutively arranging output signals of the light receiving elements in the order of interlace.

The camera process circuit 10 converts the picked-up image signals $S_n$ to luminance signals $S_Y$ and chrominance signals $S_{R-Y}$, $S_{B-Y}$ and outputs them to an image shift correction circuit 12.

Here, in the image shift correction circuit 12 luminance signals $S_Y$ are received in motion detection circuit 14, which detects a direction and magnitude of the image shift by detecting a corresponding motion vector, using frame correlation.

According to the motion vector, a control circuit 16 reads out the luminance signal $S_Y$, and chrominance signals $S_{R-Y}$, $S_{B-Y}$ temporarily stored in a video memory circuit 18 to thereby making a parallel displacement of the picked-up image by the amount of the image shift.

Figure 3:
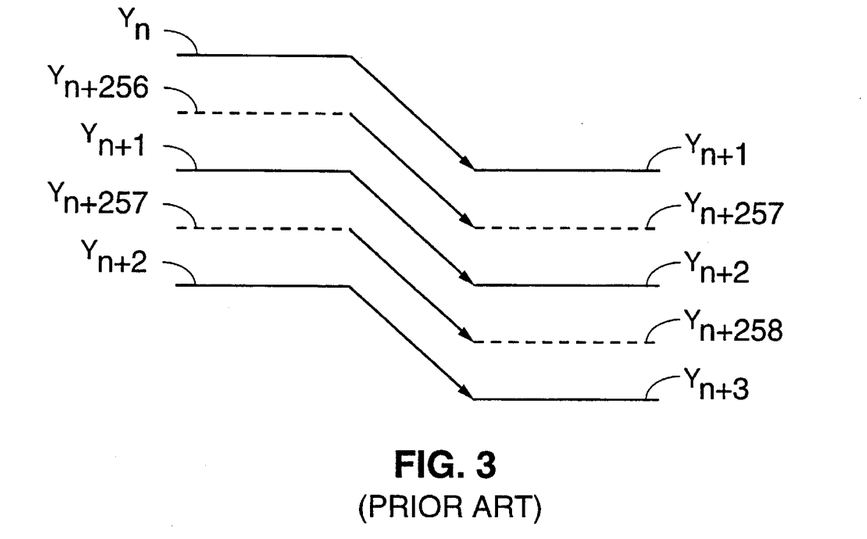
FIGS. 3 and 4 are diagrammatic views for illustrating image shift corrections by means of parallel displacements.

For example, as shown in FIG. 3, the luminance signals $S_Y$ and the chrominance signals $S_{R-Y}$, $S_{B-Y}$ of lines $y_n$, $y_{n+256}$, $y_{n+1}$, $y_{n+257}$, ... are read out at timing of lines $y_{n+1}$, $y_{n+257}$, $y_{n+2}$, $y_{n+258}$, ..., respectively, and in this case, an image of the luminance signals $S_Y$ and the chrominance signals $S_{R-Y}$, $S_{B-Y}$ is displaced by two lines in parallel.

In this manner, the control circuit 16 makes a correction of the image shift in a unit of a pixel for the horizontal direction and in a unit of two lines for the vertical direction.

Furthermore, the control circuit 16 makes a correction of the image shift at a finer accuracy in a vertical interpolation circuit 20 and a horizontal interpolation circuit 22.

More specifically, in the vertical interpolation circuit 20, output signals of the video memory circuit 18 are amplified in an amplification circuit 24, and are then provided to an adder circuit 26.

Moreover, in the vertical interpolation circuit 20 output signals of the video memory circuit 18 are provided to an amplification circuit 30 though a delay circuit 28 of which delay time is set to one horizontal scanning period, and output signals of the amplification circuit 30 are outputted to the adder circuit 26.

In such a manner, gains of the amplification circuits 24 and 30 are controlled by the control circuit 16, and thereby video signals outputted from the video memory circuit 18 are interpolated, so that image shift not larger than two lines is corrected in the vertical direction.

Figure 4:
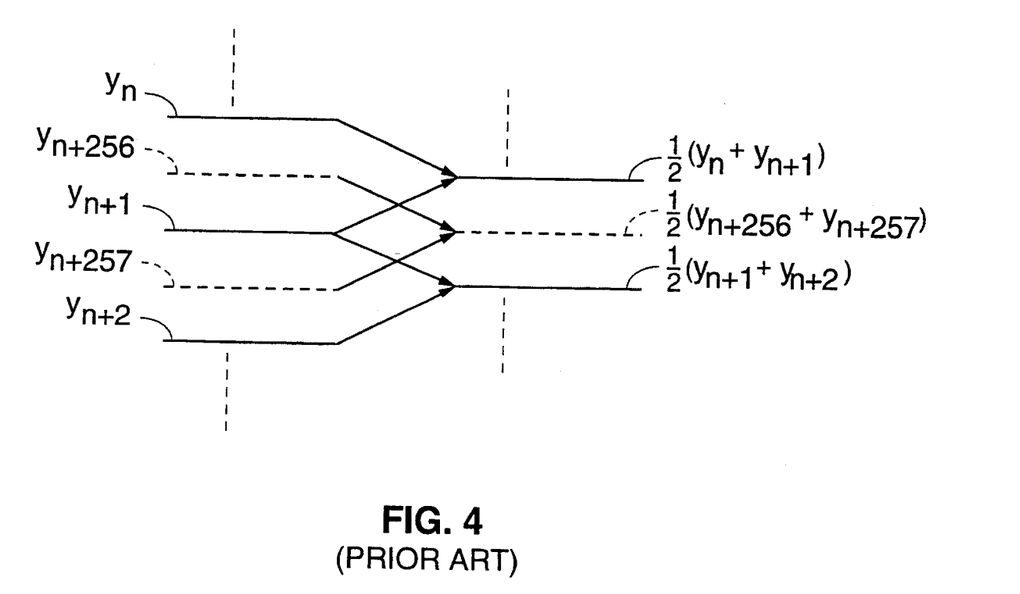

In a case where an image shift of one line is to be corrected, as shown in FIG. 4, gains of the amplification circuits 24 and 30 are set to ½ thereof, and sum signals $(y_n+y_{n+1})/2$, $(y_{n+1}+y_{n+2})/2$, ... of adjacent lines $y_n$ and $y_{n+1}$, $y_{n+1}$ and $y_{n+2}$, ... are outputted for respective fields.

Similarly, in the horizontal interpolation circuit 22, image shift smaller than intervals of pixels is corrected by the use of a delay circuit with a delay time of one clock cycle in place of the delay circuit 28.

In this manner, the image shift correction circuit 12 makes a parallel translation of the picked-up image by the amount of the image shift, so that the image shift can be corrected.

Figure 5A:
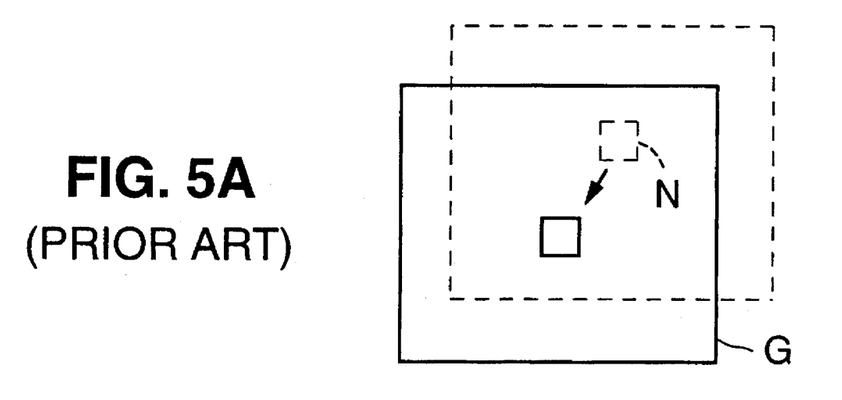
FIGS. 5A–5C are diagrammatic views for illustrating the image shift correction by enlarging a picture.
Figure 5B:
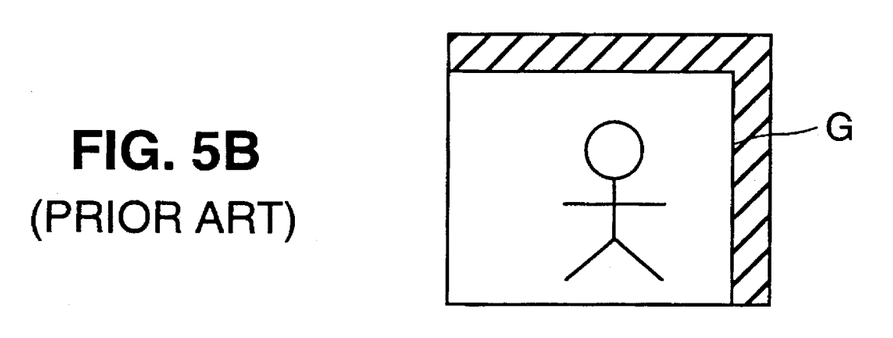

In a case where in an image G an object N of which picture has been taken at the center of the image is, as shown in FIGS. 5A–5C, moved to an upper right corner by an image shift (FIG. 5A), the image shift can be corrected by parallel translation of the whole image as indicated by the arrow (FIG. 5B).

In this case, the frame of the corner is however arranged within an angle of view as hatched, and this produces a disadvantage in that the displaced picture becomes degraded in appearance.

Figure 5C:
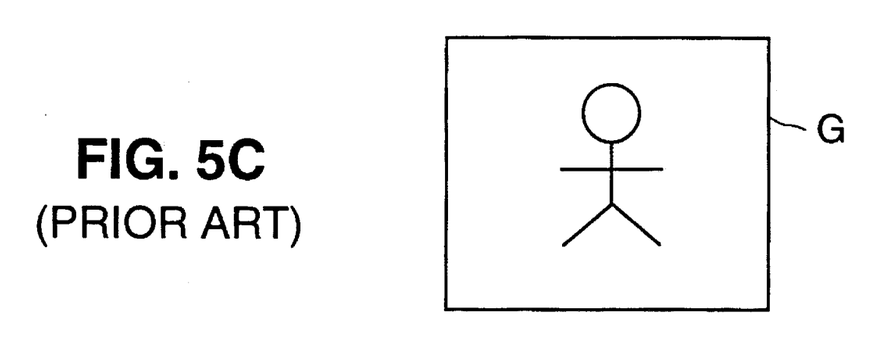

For this reason, the control circuit 12 controls timing of reading of the video memory circuit 18 and gains of the amplification circuits 24 and 30 to change an amount of parallel displacement according to the position of each image G so that the image G is enlarged not to display the corner of the frame (FIG. 5C).

More specifically, at a central portion of the image G, the parallel displacement is performed by the amount of the motion vector whereas in the peripheral portion of the image G, the parallel displacement which is obtained from the motion vector is corrected so as to enlarge the image as approaches to the peripheries. In this manner, the image shift is corrected.

Thus, the image shift can be corrected through the image shift correction circuit 12, and the corrected luminance signals and chrominance signals are outputted to a video signal synthesis circuit 32, so that video signals of which image shift has been corrected can be obtained.

In a case where image shift is corrected by the use of such a technique of vertical interpolation operation, it is an inevitable problem that deterioration in vertical resolution cannot be avoided.

Moreover, there is another problem in that vertical relationship of lines between even and odd fields is reversed by outputting sum signals $(y_n+y_{n+1})/2$, $(y_{n+1}+y_{n+2})/2$, ... of adjacent lines $y_n$ and $y_{n+1}$, $y_{n+1}$ and $y_{n+2}$, ... for each field in the horizontal interpolation circuit 22, and an inclined line, for example, is displaced in the shape of notches, which makes the displayed image ugly.

To solve this problem, a technique to correct an image shift in a unit of a frame is considered as one way, but this technique is liable to display motion pictures in duplicate.

SUMMARY OF THE INVENTION

In view of the foregoing, an object of this invention is to provide a video camera in which an image shift correction device is capable of effectively avoiding degradation in picture quality.

Figure 6:
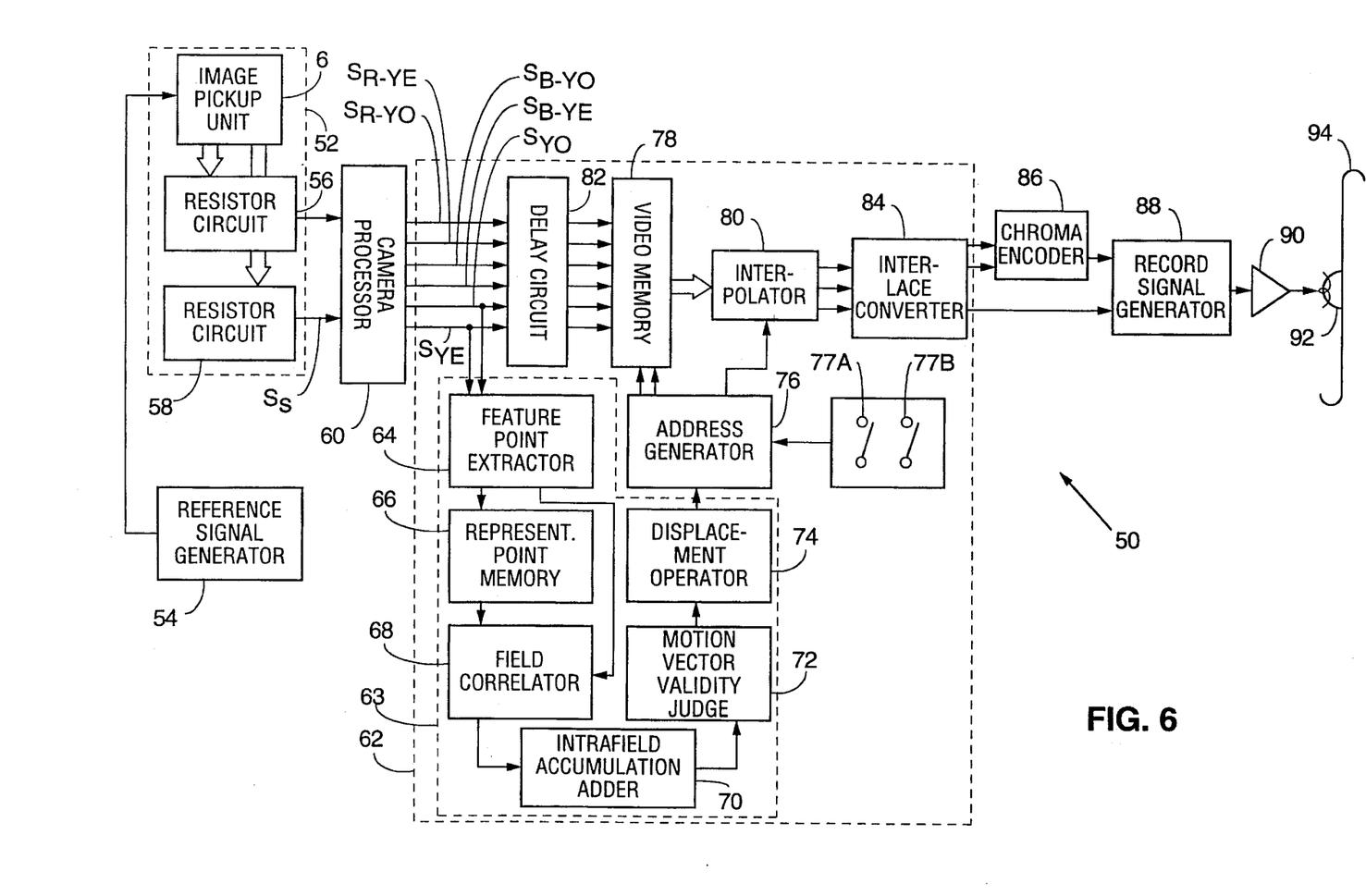
FIG. 6 is a block diagram illustrating the camera incorporated video tape recorder according to one embodiment of the present invention.

The foregoing object and other objects of the invention have been achieved by the provision of image pick-up means 52, 54 for outputting image information $S_{YO}$, $S_{YE}$, $S_{R-YO}$, $S_{R-YE}$, $S_{B-YO}$, $S_{B-YE}$ of one frame in a cycle of one field; image shift amount detection means 64, 66, 68, 70, 72 for detecting an amount of an image shift on the basis of the image information $S_{YO}$, $S_{YE}$ by the use of a field correlation of the image information $S_{YO}$, $S_{YE}$; an image shift correction means 74, 76, 78, 80 for correcting and outputting the image shift of the image information $S_{YO}$, $S_{YE}$, $S_{R-YO}$, $S_{R-YE}$, $S_{B-YO}$, $S_{B-YE}$; and video signal conversion means 84 for converting the image information outputted from the image shift correction means 74, 76, 78, 80 to video signals representing odd and even fields consecutive in a cycle of a field of the image information $S_{YO}$, $S_{YE}$, $S_{R-YO}$, $S_{R-YE}$, $S_{B-YO}$, $S_{B-YE}$.

An amount of an image shift can be detected at high accuracy by detecting it on the basis of image information $S_{YO}$, $S_{YE}$, $S_{R-YO}$, $S_{R-YE}$, $S_{B-YO}$, $S_{B-YE}$ of one frame consecutive in a cycle of one field.

Furthermore, according to the result of the detection, the image shift of the image information $S_{YO}$, $S_{YE}$, $S_{R-YO}$, $S_{R-YE}$, $S_{B-YO}$, $S_{B-YE}$ of one frame consecutive in a cycle of one field is corrected, and then converted to video signals representing odd and even fields consecutive in a cycle of a field of the image information $S_{YO}$, $S_{YE}$, $S_{R-YO}$, $S_{R-YE}$, $S_{B-YO}$, $S_{B-YE}$. In this manner, the image shift can be corrected, with effectively avoided degradation in picture quality.

From the foregoing, an image shift correction device is provided according to the present invention in which according to picked-up image signals which represent one frame of image information in a consecutive manner in a cycle of one frame, an amount of an image shift is detected and corrected, so that the image shift can be corrected with degradation in picture quality effectively avoided.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of this invention will be described with reference to the accompanying drawings:

(1) First Embodiment

In FIG. 6, 50 generally designates a camera incorporated video tape recorder, and an image of an object is picked up by a CCD solid-state image device 52.

In the CCD solid-state image device 52, according to a reference signal outputted from a reference signal generating circuit 54, charges stored in each of the light receiving elements of an image pick-up unit 6 are outputted to a camera process circuit 60 through resistor circuits 56 and 58.

In this event, the resistor circuit 56 reads in and outputs charges accumulated in odd numbered light receiving elements among vertically consecutive light receiving elements whereas the resistor circuit 58 reads in and outputs charges accumulated in even numbered light receiving elements.

Figure 7:
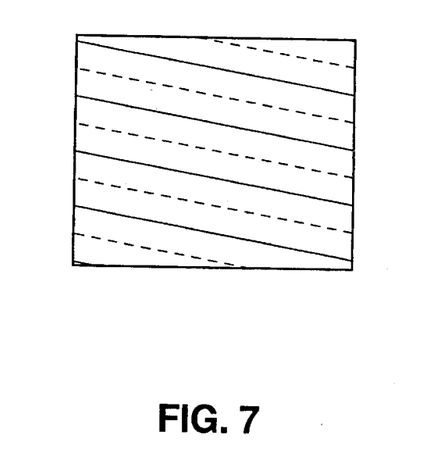
FIG. 7 is a diagrammatic view for illustrating the picked-up image signals.

Consequently, picked-up image signals of even and odd fields (that is, as shown by the solid and broken lines) are, as illustrated in FIG. 7, obtained through resistor circuits 56 and 58, respectively.

In this event, in the pick-up image device 52 operation is carried out in response to reference signals outputted from the reference signal generating circuit 54, and thereby picked-up signals $S_s$ which are repeatedly provided in a cycle of 1/60 sec (that is, one field cycle of interlace video signals) are outputted through the resistor circuits 56 and 58.

The picked-up image signals which are consecutive in the order of the interlace can be therefore processed by reading in output signals of the resistor circuits 56 and 58 in the cycle of 1/60 sec, for example.

In this embodiment, the image pick-up device 52 thus constitutes an image pick-up device which repeatedly outputs one frame of image information in a cycle of one field.

Here, the camera process circuit 60 concurrently performs parallel processing of the output signals of the resistor circuits 56 and 58, and thereby luminance signals $S_{YO}$ and $S_{YE}$, and chrominance signals $S_{R-YO}$ and $S_{R-YE}$, and $S_{B-YO}$ and $S_{B-YE}$ of even and odd fields are repeatedly outputted in a cycle of 1/60 sec.

An image shift correction circuit 62 accepts luminance signals $S_{YO}$ and $S_{YE}$ of even and odd fields to detect motion vectors.

More specifically, in the image shift correction circuit 62 the luminance signals $S_{YO}$ and $S_{YE}$ are fed to a feature point extraction circuit 64 of a correction amount detection circuit 63.

Here, the feature point extraction circuit 64 detects edges of the picked-up image by differentiating the luminance signals $S_{YO}$ and $S_{YE}$, and sets feature points on the edges at predetermined intervals.

Moreover, the feature point extraction circuit 64 stores the image data of the feature points in a representative point memory circuit 66. In this embodiment, motion vectors are detected with reference to feature points.

Furthermore, the feature point extraction circuit 64 outputs luminance signals $S_{YO}$ and $S_{YE}$ to a field correlation circuit 68 after the setting of the feature points is completed.

The representative point memory circuit 66 delays the image data of the feature points by a cycle of 1/60 sec, and outputs it together with coordinate data thereof to the field correlation circuit 68.

The field correlation circuit 68 sets a motion vector detection area on the basis of the coordinate data outputted from the representative point memory circuit 66, and thereby determines a motion vector detection area around feature points which are set in the previous cycle (that is, feature points which are set about luminance signals $S_{YO}$ and $S_{YE}$ inputted in the previous cycle of 1/60 sec).

Furthermore, within the motion vector detection area, the field correlation circuit 68 sequentially subtracts image data within the motion vector detection area from the image data of feature points of the previous cycle, and outputs the outcome of the subtraction to an intrafield accumulation adder circuit 70.

In this manner, through the field correlation circuit 68, the image constructed of luminance signals $S_{YO}$ and $S_{YE}$ of the previous cycle is sequentially shifted in a unit of a pixel in the horizontal and vertical directions, and thereby difference data of feature points between the image and another image constructed of luminance signals $S_{YO}$ and $S_{YE}$ of the subsequent cycle can be sequentially attained.

The intrafield accumulation adder circuit 70 attains an absolute value of the difference data inputted, and the absolute value is accumulated for each shift position of a feature point.

A motion vector validity judging circuit 72 detects a minimum value from the accumulated sum of the absolute value detected in the intrafield accumulation adder circuit 70.

Furthermore, the motion vector validity judging circuit 72 calculates accumulated sums in the vicinity of the minimum value, and these accumulated sums are approximated by a quadratic curve to detect a minimum value. Thus, motion vectors are detected at an accuracy smaller than the pixel unit.

More specifically, an image shifted can be coincided with an image of the previous cycle by displacing the shifted image by the amount of the shift.

Accordingly, if an absolute sum of each difference data is obtained by sequentially moving the image, the minimum value of difference data of each feature point is obtained at a position to which the image is displaced by the amount of the image shift.

That is, the amount of the image shift can be detected by detecting the minimum value of the accumulated value. Even if the background, for example, is slightly changed within an angle of view, it is possible to detect the amount of the image shift.

Moreover, the motion vector validity judging circuit 72 detects accumulated sums in the vicinity of the minimum value detected, and thereby judges validity of the motion vector detected.

That is, in a case where the accumulated sums rapidly decrease, it is judged that the motion vector and the image shift are equal in amount since feature points are set on the edges.

On the other hand, in a case where there are local minimums substantially equal to the minimum of the accumulated sums with a small decrease in the accumulated sums, the detected motion vector and the image shift are not equal in amount.

Accordingly, the motion vector validity judging circuit 72 makes a judgement as to whether or not the detected motion vector is equal in amount to the image shift by detecting accumulated sums in the vicinity of the minimum detected. When the motion vector validity judging circuit 72 judges that they are not equal, it outputs an amount of the image shift immediately previously detected.

On the contrary, when it is judged that the motion vector detected is equal in amount to the image shift, the detected motion vector is outputted as an amount of the image shift.

In this manner, one frame of image information is repeatedly read in a cycle of one field, and a motion vector is detected on the basis of the image information. The amount of image shift can be detected at high accuracy as compared to the prior art in which motion vector is detected by the use of frame correlation.

Figure 8:
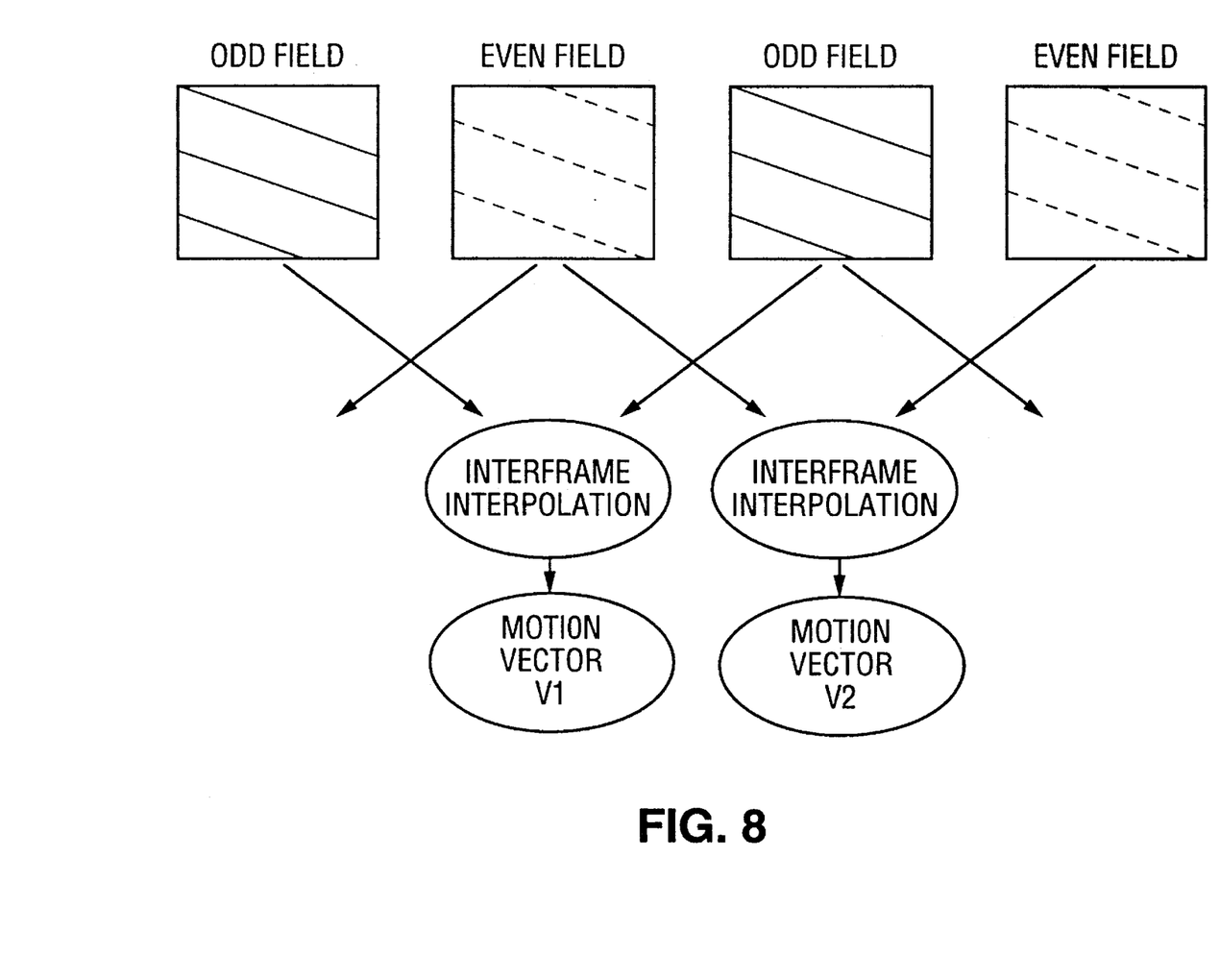
FIGS. 8 and 9 are diagrammatic views for illustrating detection of the image shift correction.

More specifically, in a case where motion vectors are, as shown in FIG. 8, detected according to luminance signals of the conventional interlace, an image of an object to compared is obtained only in a cycle of 1/30 sec.

Accordingly, in a case where motion vectors are detected according to one frame of image information as in this embodiment, they are detected only in the cycle of 1/30 sec, and thus accuracy of correction is deteriorated in a case where image shift correction is conducted on the basis of the motion vectors.

On the contrary, in a case where motion vectors are respectively detected between even fields and between odd fields in a cycle of 1/60 sec as in this embodiment, motion vectors V1 and V2 are detected on the basis of image information of one field, and accordingly accuracy in detection is deteriorated.

Figure 9:
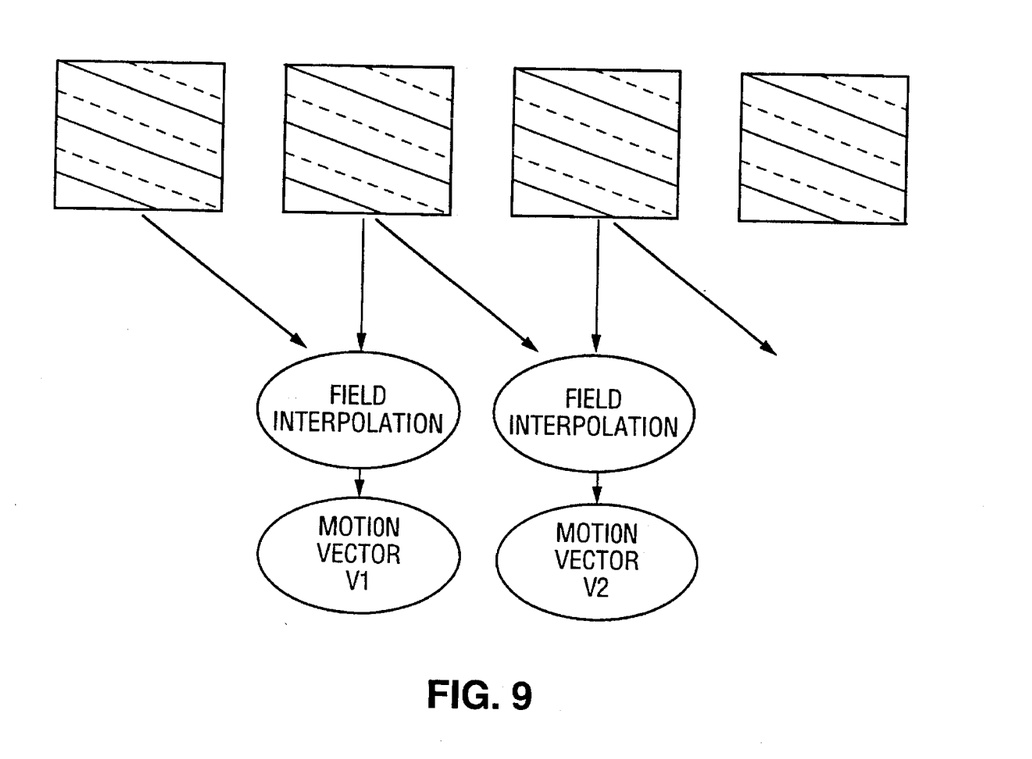

As shown in FIG. 9, motion vectors V1, V2, . . . can be detected in a cycle of 1/60 sec on the basis of one frame of image information by repeatedly reading in the one frame of image information in a cycle of one field to detect the motion vectors, and accordingly the motion vectors V1, V2, . . . can be detected at high accuracy compared to the conventional technique, so that the amount of image shift can be detected at high accuracy.

A displacement operation circuit 74 delays output data thereof by one field cycle and makes subtraction thereof from output data of the motion vector validity judging circuit 72 for outputting the resulting data, and thereby a correction of the image shift is detected.

More specifically, an amount of image shift calculated from a motion vector with reference to an image of the previous field is converted to a displacement with reference to a predetermined reference field, and thereby the image shift is corrected by correcting the picked-up image according to the displacement.

On the basis of the output data of the displacement operation circuit 74, an address generation circuit 76 constructs address data for a video memory circuit 78 and control data for an interpolation circuit 80, and thereby the image shift of the picked-up image is corrected according to the output data of the displacement operation circuit 74.

In this event, the address generation circuit 76 starts the image shift correction operation when an image shift correction operating member 77A on an operation panel is turned on.

When a second operating member 77B on the operation panel is placed off, image shift correction is made only by parallel translation whereas when the second operating member 77B is turned on, image shift correction is carried out by enlarging the image in addition to the parallel translation.

In the video memory circuit 78, luminance signals $S_{YO}$ and $S_{YE}$, and chrominance signals $S_{R\text{-}YO}$ and $S_{R\text{-}YE}$, and $S_{B\text{-}YO}$ and $S_{B\text{-}YE}$ which are inputted through a delay circuit 82 are sequentially stored, and are sequentially outputted according to address data outputted from the address generation circuit 76.

In this event, the video memory circuit 78 sequentially outputs one frame of image information consecutive in a cycle of one field, and thereby the image shift is corrected in a unit of one line.

Figure 10:
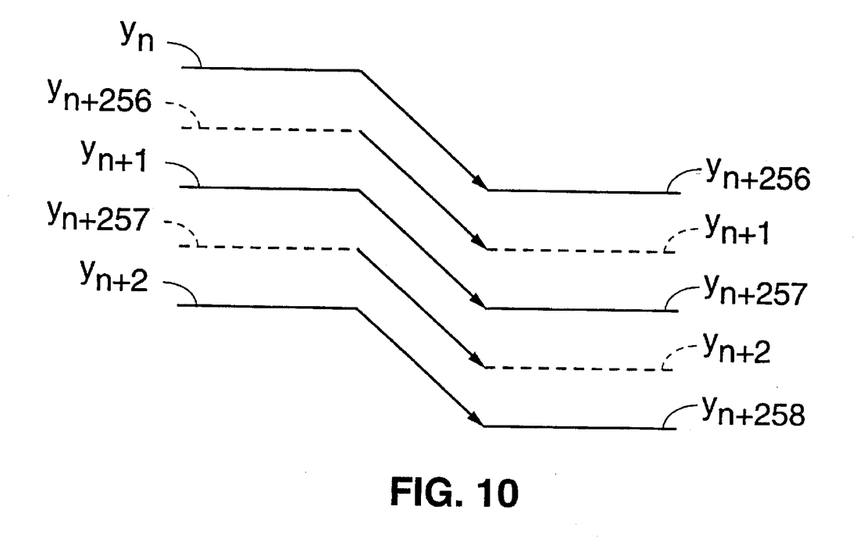
FIG. 10 is a diagrammatic view for illustrating the image shift correction.

More specifically, as shown in FIG. 10, the image shift is corrected in a unit of one line by sequentially outputting luminance signals $S_{YO}$ and $S_{YE}$, and chrominance signals $S_{R-YO}$ and $S_{R-YE}$, and $S_{B-YO}$ and $S_{B-YE}$ of lines $y_n$, $y_{n+256}$, $y_{n+1}$, $y_{n+257}$, ... at timing of lines $y_{n+256}$, $y_{n+1}$, $y_{n+257}$, ...

Here, the video memory circuit 78 outputs luminance and chrominance signals which are repeated in the order of noninterlace in a cycle of 1/60 sec, to which signals luminance signals $S_{YE}$ and chrominance signals $S_{R-YE}$ and $S_{B-YE}$, and luminance signals $S_{YO}$ and chrominance signals $S_{R-YO}$ and $S_{B-YO}$ are converted, the luminance signals $S_{YE}$ and chrominance signals $S_{R-YE}$ and $S_{B-YE}$ being constructed by repeating image information of even fields in a cycle of 1/60 sec, and the luminance signals $S_{YO}$ and chrominance signals $S_{R-YO}$ and $S_{B-YO}$ being constructed by repeating image information of odd fields in a cycle of 1/60 sec.

On the other hand, the interpolation circuit 80 includes an interpolation circuit which has the same configuration as the conventional vertical interpolation circuit 20 and the horizontal interpolation circuit 22 (FIG. 1) but operates at a double frequency, and image shift correction is performed in a unit smaller than one line by interpolating luminance and chrominance signals outputted from the video memory circuit 78.

In a case where image shift correction is carried out on an image shift of interlace signals, correction in a unit smaller than two lines is conventionally conducted by no other than interpolation operation. On the other hand, in this embodiment one frame of image information is repeated in a cycle of one field, and thereby a correction in a unit smaller than one line can be achieved by interpolation, so that degradation in vertical resolution can be effectively avoided.

Moreover in this event, an amount of correction can be detected at high accuracy by detecting the image shift correction amount on the basis of one frame of image information which is repeated in a cycle of one field, and image shift correction can be made at high accuracy by doing it on the basis of the correction amount.

Furthermore, reversal of vertical relationship of lines can be effectively avoided by image shift correction of one frame of image information which is repeated in a cycle of one field, and thereby degradation in picture quality is effectively avoided.

An interlace conversion circuit 84 temporarily converts luminance signals and chrominance signals, which are repeated in the order of noninterlace in a cycle of 1/60 sec, to luminance signals and chrominance signals interlaced by temporarily storing the signals in a memory circuit, and then by outputting them.

A chroma encoder 86 modulates and converts chrominance signals to chroma signals.

A record signal generation circuit 88 performs frequency modulation of the luminance signals as well as low frequency conversion of the chroma signals to thereby convert the luminance and chrominance signals to record signals, which are then outputted to a magnetic head 92 through a record signal amplification circuit 90. The video signals which has undergone image shift correction can be thus recorded on a magnetic tape 94.

From the foregoing, in this embodiment the feature point extraction circuit 64, the representative point memory circuit 66, the field correlation circuit 68, the intrafield accumulation adder circuit 70 and the motion vector validity judging circuit 72 constitute image shift amount detection means for detecting an amount of an image shift by the use of the field correlation of image information on the basis of the one frame of image information consecutive in a cycle of one field. On the other hand, the displacement operation circuit 74, the address generation circuit 76, the video memory circuit 78 and the interpolation circuit 80 constitute a correction circuit for correcting the image shift of the image information by parallel translating and by enlarging the image of the image information to thereby output the resulting image.

The interlace conversion circuit 84 constitutes a video signal synthesis circuit for converting the image information, outputted from the correction circuit to video signals representing odd and even fields consecutive in a cycle of a field of the image information.

In such a construction, picked-up signals $S_s$ which represent one frame of image information consecutive in a cycle of one field are obtained through the image pick-up device 52, and the picked-up signals $S_s$ are converted to luminance signals $S_{YO}$ and $S_{YE}$, and chrominance signals $S_{R-YO}$ and $S_{R-YE}$, and $S_{B-YO}$ and $S_{B-YE}$ in the camera process circuit 60.

The luminance signals $S_{YO}$ and $S_{YE}$ among these signals undergo edge extraction in the feature point extraction circuit 64, and representative points are set on the edges detected.

Furthermore, differential data of the luminance signals $S_{YO}$ and $S_{YE}$ are sequentially provided about the representative points as centers by the field correlation circuit 68, and motion vectors are thereby detected through the intrafield accumulation adder circuit 70 and the motion vector validity judging circuit 72, so that an amount of each image shift is detected.

An amount of an image shift can be detected at high accuracy by detecting it on the basis of luminance signals $S_{YO}$ and $S_{YE}$ which represent one frame of image information consecutive in a cycle of one field.

Accordingly, image shift correction can be performed at high accuracy as compared to the prior art by making image shift correction on the basis of the result of the detection, and thereby degradation in picture quality can be effectively avoided.

The detected amount of the image shift correction is outputted to the address generation circuit 76, where according to the amount of correction, address data and control data of the interpolation circuit 80 are constructed.

The luminance signals $S_{YO}$ and $S_{YE}$, and chrominance signals $S_{R-YO}$ and $S_{R-YE}$, and $S_{B-YO}$ and $S_{B-YE}$ which have been temporarily stored in the video memory circuit are outputted after the signals are subjected to image shift correction in a unit of a line in the vertical scanning direction and in a unit of a pixel in the horizontal direction, and then converted to one frame of image information which is consecutive in a cycle of one field.

The image information outputted from the video memory circuit 78 undergoes image shift correction at an accuracy in a unit smaller than a pixel unit and a line unit in the interpolation circuit 80 in horizontal and vertical scanning directions, and then is converted to interlace video signals in the interlace conversion circuit 84.

The luminance signals $S_{YO}$ and $S_{YE}$, and chrominance signals $S_{R-YO}$ and $S_{R-YE}$, and $S_{B-YO}$ and $S_{B-YE}$ which represent one frame of image information consecutive in a cycle of one field undergo image shift correction, and then are converted to interlace video signals in the interlace conversion circuit 84. The image shift correction can be thus made with degradation in picture quality effectively avoided.

According to the foregoing construction, an amount of an image shift is detected on the basis of luminance signals $S_{YO}$ and $S_{YE}$ which represent one frame of image information consecutive in a cycle of one field. The luminance signals $S_{YO}$ and $S_{YE}$, and chrominance signals $S_{R-YO}$ and $S_{R-YE}$, and $S_{B-YO}$ and $S_{B-YE}$ which represent one frame of image information consecutive in a cycle of one field undergo image shift correction, and then are converted to interlace video signals in the interlace conversion circuit 84. In this manner, the image shift correction can be made at high accuracy with degradation in picture quality effectively avoided.

(2) Second Embodiment

Figure 11:
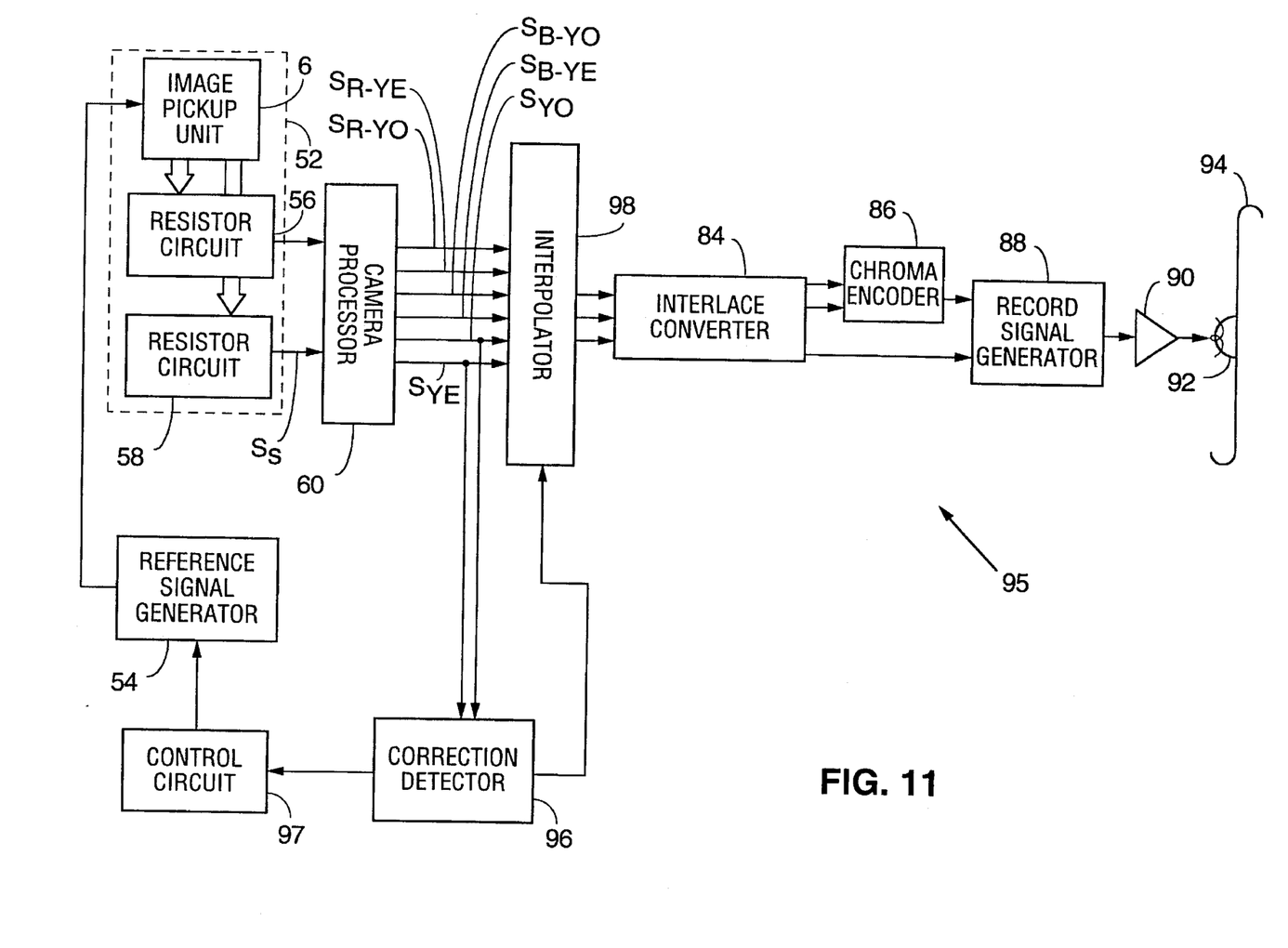
FIG. 11 is a block diagram showing the second embodiment.

In FIG. 11 in which parts corresponding to those of FIG. 6 are allotted the same reference numerals, 95 generally designates a camera incorporated video tape recorder, and image shift correction is roughly carried out by controlling timing of the image pick-up device 52 in place of the video memory circuit 78.

More specifically, in the camera incorporated video tape recorder 95, a correction detection circuit 96 detects image shift amount by the use of a technique similar to that of the first embodiment, and then detects an image shift correction amount by integrating the result of the detection.

Moreover, according to the result of the detection the correction detection circuit 96 outputs a control signal to a control circuit 97, and thereby the timing of the image pick-up device 52 is controlled, so that image shift is corrected in a unit of pixel in the horizontal scanning direction and in a unit of one line in the vertical scanning direction.

On the other hand, similarly with the interpolation circuit 80 an interpolation circuit 98 corrects the image shift of the luminance signals $S_{YO}$ and $S_{YE}$ and chrominance signals $S_{R-YO}$ and $S_{R-YE}$, and $S_{B-YO}$ and $S_{B-YE}$ sequentially inputted in a unit smaller than a pixel and a line in horizontal and vertical directions, respectively.

According to the construction illustrated in FIG. 11, by performing image shift correction by controlling the timing of the image pick-up device 52 in place of the video memory circuit, the image shift correction can be performed with a simple construction, effectively avoiding degradation in picture quality.

(3) The Other Embodiment

In the preceding embodiments, it is stated that an image of an object is picked up by the use of CCD solid-state image pick-up device. The present invention is however not limited to this, and may be widely applied to various image pick-up means.

Furthermore in the embodiments above, it described that the present invention is applied to the camera incorporated video tape recorder. However, the present invention is not restricted to this but may be applied a television camera, for example.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A video camera, comprising:

image pick-up means for outputting in a timing cycle of one field a frame of image information, wherein said frame of image information contains two fields of image information;

image shift amount detection means coupled to said image pick-up means for detecting an amount of an image shift by using the frame of image information in a field correlation of the frame of image information;

image shift correction means coupled to said image shift amount detection means for correcting and outputting the image shift of the frame of image information in accordance with the detection of said image shift amount by said image shift amount detection means and in accordance with said field correlation of the frame of image information, wherein said image shift correction means includes means for controlling the timing of outputting the image information from said image pick-up means in accordance with the output of said image shift amount detection means, and further wherein said image shift correction means integrates the output of said image shift amount detection means; and video signal conversion means coupled to said image shift correction means for converting the corrected image shift of the frame of image information, outputted from the image shift correction means, to video signals representing consecutive odd and even fields in a cycle of a field of the image information.

2. A video camera comprising:

image pick-up means for outputting in a timing cycle of one field a frame of image information, wherein said frame of image information is output as two fields of image information concurrently in the timing cycle of one field;

image shift amount detection means coupled to said image pick-up means for detecting an amount of an image shift by using the frame of image information in a field correlation of the frame of image information;

image shift correction means coupled to said image shift amount detection means for correcting and outputting the image shift of the frame of image information in accordance with the detection of said image shift amount by said image shift amount detection means and in accordance with said field correlation of the frame of image information, wherein said image shift correction means includes means for controlling the timing of the outputting of the frame of image information by said image pick-up means in accordance with the output of said image shift amount detection means; and video signal conversion means coupled to said image shift correction means for converting the corrected image shift of the frame of image information, outputted from the image shift correction means, to video signals representing consecutive odd and even fields in a cycle of a field of the image information.

* * * * *